(12) United States Patent
Verma

(10) Patent No.: US 12,511,442 B2
(45) Date of Patent: Dec. 30, 2025

(54) SESSION TRANSFER BETWEEN SMART GLASSES AND COMPUTER FOR MAINTAINING A CONFIDENTIAL DATA VIEW

(71) Applicant: Bank of America Corporation, Charlotte, NC (US)

(72) Inventor: Sandeep Verma, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 137 days.

(21) Appl. No.: 18/374,039

(22) Filed: Sep. 28, 2023

(65) Prior Publication Data

US 2025/0111098 A1 Apr. 3, 2025

(51) Int. Cl.
*G06F 21/84* (2013.01)
*G06F 21/62* (2013.01)

(52) U.S. Cl.
CPC .......... *G06F 21/84* (2013.01); *G06F 21/6245* (2013.01)

(58) Field of Classification Search
CPC ...... G06F 21/60; G06F 21/62; G06F 21/6218; G06F 21/6245; G06F 21/70; G06F 21/82; G06F 21/84
See application file for complete search history.

(56) References Cited

U.S. PATENT DOCUMENTS

| | | | |
|---|---|---|---|
| 9,985,786 B1* | 5/2018 | Bhabbur | G06F 3/0488 |
| 2016/0188886 A1* | 6/2016 | Weiss | G06Q 40/04 |
| | | | 726/26 |
| 2018/0107839 A1* | 4/2018 | Clement | G06F 3/017 |
| 2019/0310757 A1 | 10/2019 | Lee et al. | |
| 2019/0392163 A1* | 12/2019 | Lake | G06F 3/1454 |
| 2024/0354431 A1* | 10/2024 | Mori | G06F 21/6245 |

* cited by examiner

*Primary Examiner* — D'Arcy Winston Straub
(74) *Attorney, Agent, or Firm* — Weiss & Arons LLP

(57) ABSTRACT

A method for session-sharing between an electronic interactive session hosted at a first device and a session hosted at a second device is provided. The second device includes a display arrangement to input confidential information to the second device absent visual trespass. The method also includes establishing communication between a common data storage device, the first device and the second device, transferring user session initiation information to the common data storage device and receiving a user command. The user command locks the first user session at the first device, sends an instruction to the first device to mask a display associated with the first user session, maintains the session initiation information entered at the first device in the database and creates a second user session. The second user session invokes the information from the first device in order to support a confidential data input session at the second device.

20 Claims, 8 Drawing Sheets

SESSION TRANSFER BETWEEN SMART GLASSES AND COMPUTER FOR MAINTAINING A CONFIDENTIAL DATA VIEW

FIELD OF TECHNOLOGY

Aspects of the disclosure relate to smart glass communications.

BACKGROUND OF THE DISCLOSURE

Different devices such as desktop, laptop, mobile, tablet computers and latest technologies like smart glasses come with different advantages and disadvantages.

Working on desktop, notebook and tablet computers is comparatively easy and convenient to many users. Such computers typically have a big screen, an external mouse to easily navigate to different parts of the screen, and a full-size keypad for typing long documents, etc.

However, such computers can also bring security and privacy issues when used in public places. Fraudsters can watch them from a distance, unnoticed.

Wearable devices such as smart glasses are less convenient if users have to type a large amount of text or navigate through a complex user interface (UI) workflow. At the same time, however, they bring higher security and privacy to the users as fraudsters cannot view the screens that users are seeing on the smart glasses or typing inside the smart glasses.

At present, there is no method available which can offer to have the benefits of both the technologies (computers and smart glasses) together in one session of application navigation.

It would be desirable to provide systems and methods that include the benefits of both the technologies (computers and smart glasses or other mobile devices) together in one session of application navigation.

SUMMARY OF THE DISCLOSURE

A method for session-sharing between an electronic interactive session hosted at a first device and an electronic interactive session hosted at a second, preferably mobile, device is provided. The method may include initiating a first computing session at a first computing device. The first computing device may be configured to receive user session initiation information for use in initiation of the first computing session. The first computing device may be configured to display a Quick Response (QR) code, said QR code configured to trigger, upon being scanned by a QR code scanner in a second computing device, a second computing session at the second computing device;

In response to the trigger, the method may include initiating the second computing session at the second computing device. The second computing device may be configured to receive, using the QR code scanner and a receiver, the user session initiation information for use in triggering initiation of the second computing session. The second computing device may be a mobile computing device including a display arrangement to enable a user to input confidential information to the second computing device absent visual trespass.

The method may further include establishing communication between a common data storage device, the first computing device and the second computing device. The method may also include transferring the user session initiation information for storage in the database of the common data storage device.

The method may include receiving a user command. The user command may be configured to lock the first user session at the first computing device, send an instruction to the first computing device to mask a display associated with the first user session, maintain the session initiation information entered at the first computing device in the database and create the second user session. The second user session may invoke the information from the first computing device in order to support a confidential data input session at the second computing device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
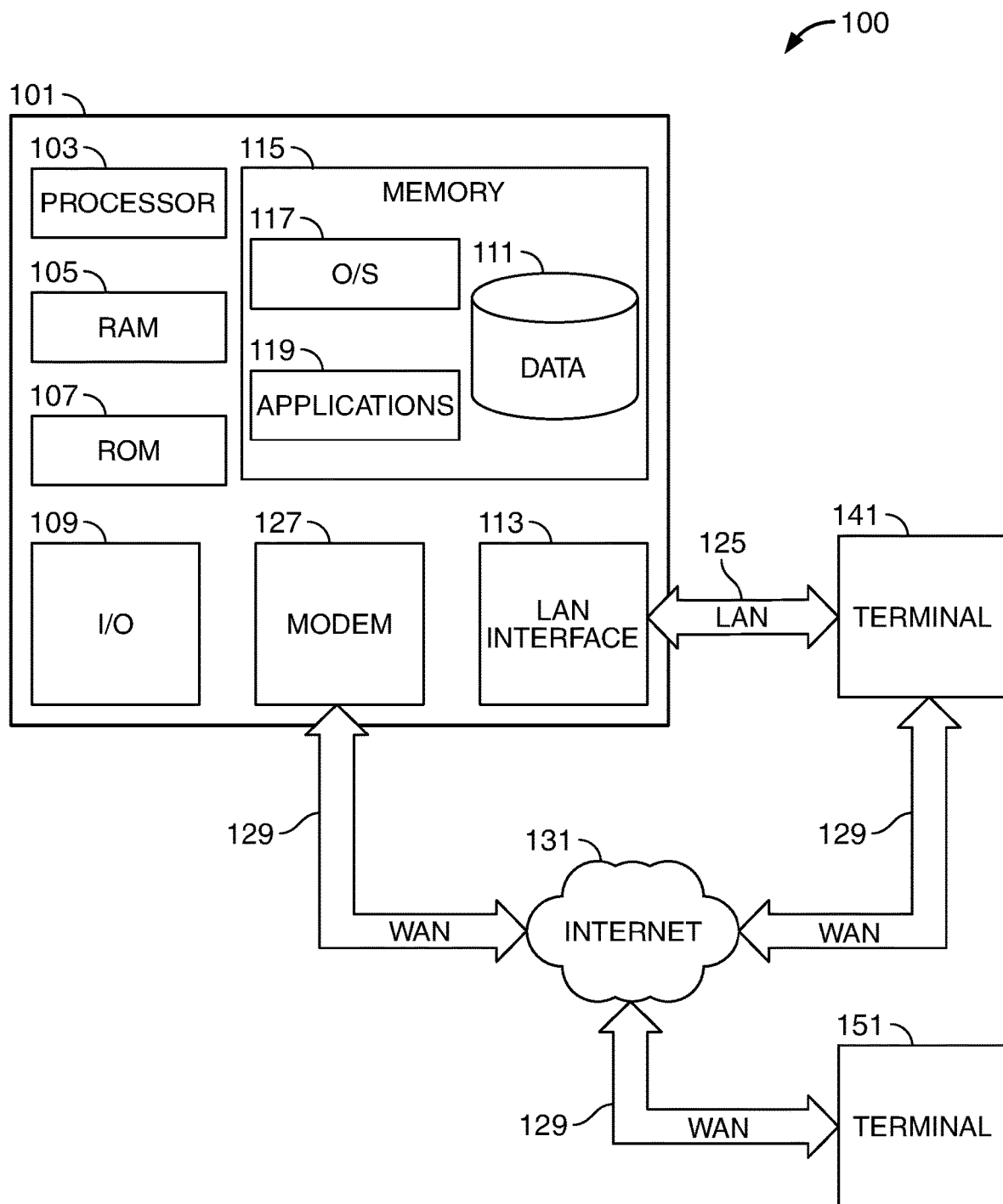
FIG. 1 shows an illustrative diagram in accordance with principles of the disclosure.

Apparatus, methods and systems for providing session-sharing to smoothly toggle between a session hosted at a first device and a session hosted at a second device are provided. The second device can be a mobile device. The session-sharing system may include a first computing device for initiating a first computing session and a second computing device for initiating a second session.

The second computing device may be a mobile computing device including a display arrangement to enable a user to input confidential information to the second computing device absent visual trespass.

The system may also include a common data storage device having a processor and a database. The common data storage device may be in electronic communication, via the processor, with the first computing device and the second computing device.

The first computing device may be configured to receive user session initiation information for use in initiation of a first user session. The user session initiation information may, in certain circumstances, be transferred for storage in the database of the common data storage device.

The second computing device may include a receiver. The receiver may receive a user command to lock the first user session at the first computing device. The command may also serve to send an instruction to the first computing device to mask a display associated with the first user session, maintain the session initiation information entered at the first computing device in the database and create a second user session. The second user session may invoke the information from the first computing device to support a confidential data input session at the second computing device.

In some embodiments, the second computing device may be further configured to receive, within the second user session, confidential input data from the user. The confidential input data may authorize the user to participate in a protected region of the first user session absent a corresponding showing of user confidential data on the first computing device.

Upon receipt of the confidential input data from the user, the second computing device may be further configured to authenticate the user to the common data storage device, terminate the second user session and/or release the first user session to enable the user to interact with the first user session.

The first computing device may include a computer selected from a group consisting of a desktop computer, a laptop computer and a notebook computer. In some embodiments the second computing device may include a smart glasses device. It should be noted that the second computing device may include any suitable device such as a mobile phone, or other, relatively more discrete, mobile device.

The display arrangement of the second computing device may further include a virtual keyboard for display on a display of the second computing device. The virtual keyboard may be configured to receive an eye focus for a pre-determined amount of time to register a keystroke. It should be noted that the second computing device may be configured to receive input from a user with other suitable input configurations.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an artificial intelligence implemented termination program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an artificial intelligence implemented termination program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented termination program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an artificial intelligence implemented termination program and security protocols, as well as other programs. In an embodiment, one or more programs, or aspects of a program, may use one or more AI/ML algorithm(s). The various tasks may be related to terminating or preventing a malicious AI from completing its malicious activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
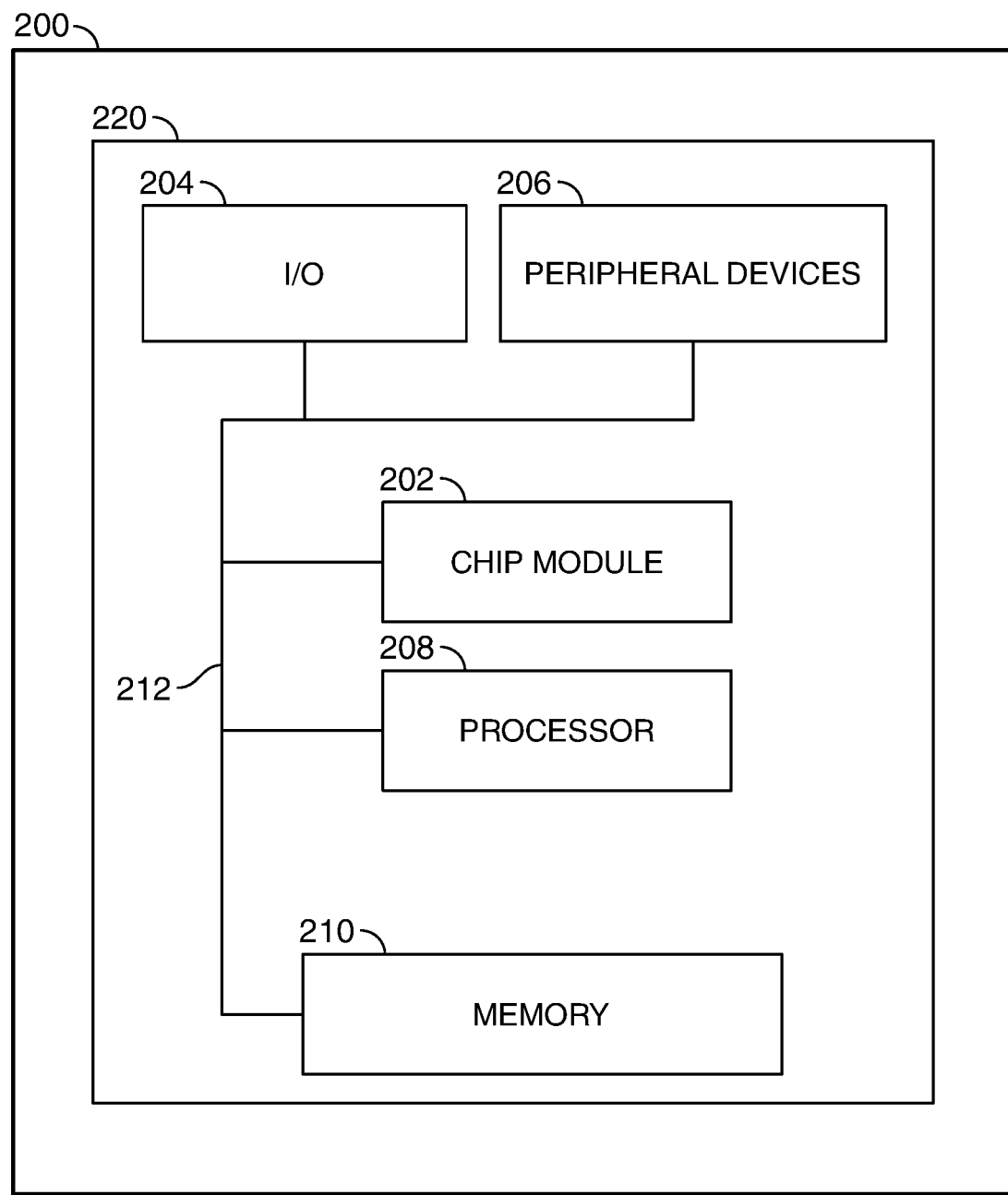
FIG. 2 shows another illustrative diagram in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-9. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
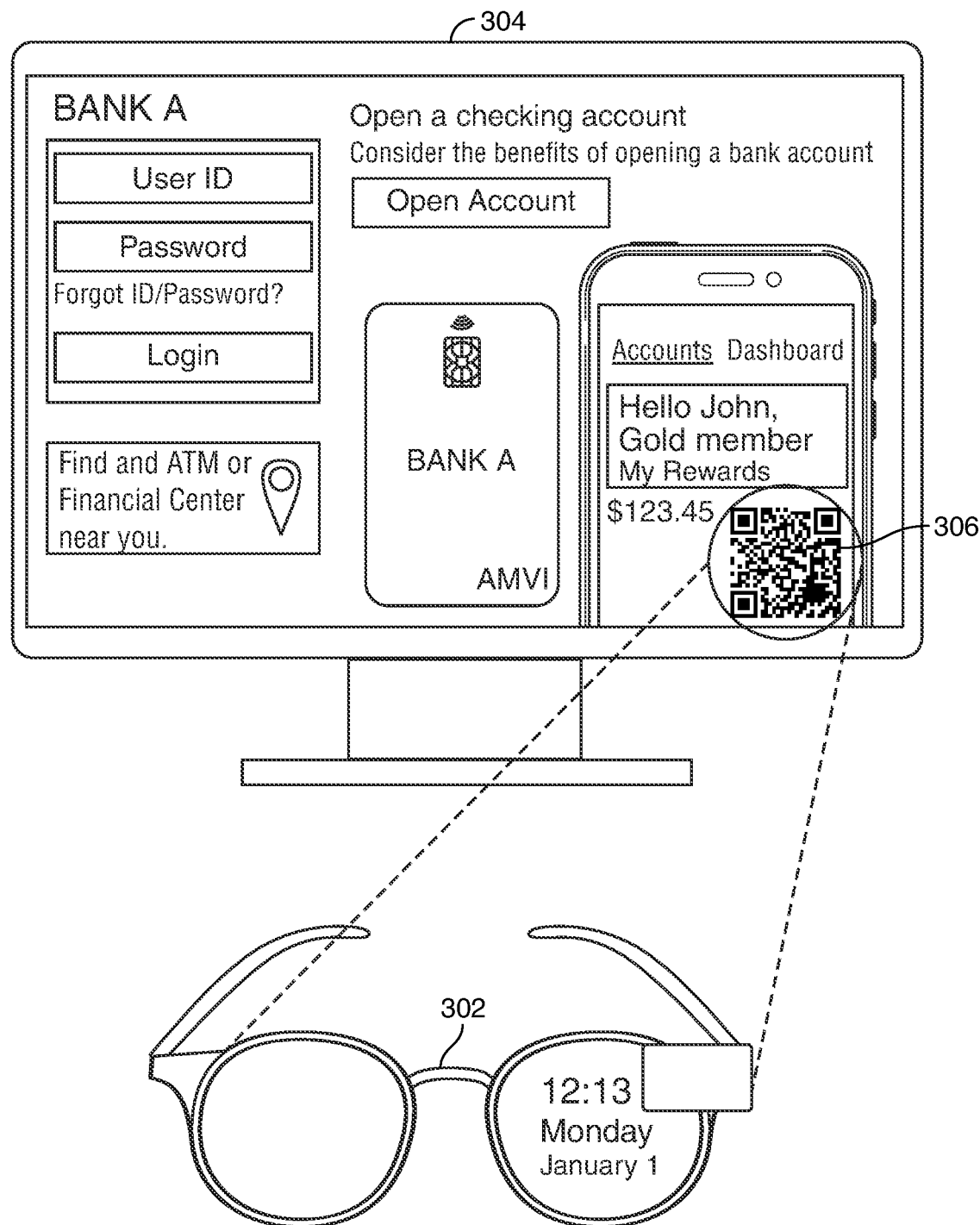
FIG. 3 shows a website and smart glasses in accordance with principles of the disclosure.

FIG. 3 shows a website and smart glasses in accordance with principles of the disclosure. At FIG. 3, a website shown on a computer 304 offers a QR code 306 at the bottom right corner of the page to scan and import, or otherwise activate, the current website session into smart glasses 302 (or other suitable device). It should be noted that the web pages can be configured to enable the shifting of confidential information to a second device, as follows.

In some embodiments, a user scans the QR code 306, when wearing the smart glasses 302, by holding the user's eye focus on QR code 306 for 2 seconds or more or for some other suitable amount of time.

The foregoing represents a trigger to transfer from a first session at the computer to smart glasses 302. This trigger thus includes using smart glasses to 302 to scan and execute the information stored in QR code 306. It should be noted that, in certain embodiments, smart glasses 302 or other mobile devices may only be able to scan QR code 306 if smart glasses 302 or other mobile devices were preferably pre-registered for use with QR code 306.

Such pre-registering may include loading a private key onto devices relevant to the user information that enables the user to make the QR code 306 scannable and/or readable to the mobile devices. For example, QR code 306 may encode information that includes a public key. Such a key may only be accessible in response to scan by a device that houses a private key.

Public key cryptography is a method of encrypting or signing data with two different keys and making one of the keys, the public key, available for anyone to use. In the embodiment set forth herein, a public key is made available through QR code 306. The other key is known as the private key. Data encrypted with the public key can only be decrypted with the private key. In the embodiment set forth herein, smart glasses 306 could be pre-registered by being coded with the private key. As such, only pre-registered devices could scan and use QR code 306 to carry over the session initiated at computer 304. Such a carry over may include initiating a second session at smart glasses device 302 based on the first session at computer 304.

In embodiments set forth herein, a first public key can be provided by a user associated with a smart glasses device 302. Smart glasses device 302 preferably may be pre-registered using such a public key. In addition, smart glasses device 302 may also be equipped with a private key. When a QR code 306 is embedded with a public key associated with smart glasses device 302, then only smart glasses device 302 or other device equipped with a suitable private key can access the information in QR code 306.

Figure 4:
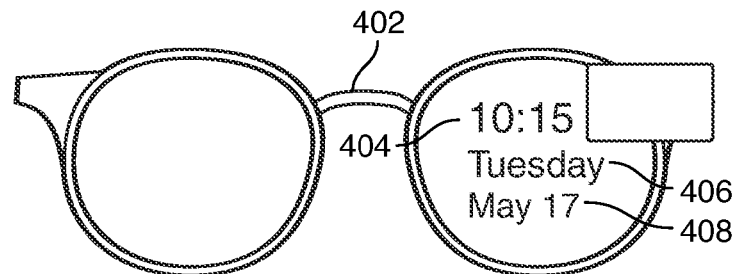
FIG. 4 shows smart glasses in accordance with principles of the disclosure.

FIG. 4 shows smart glasses in accordance with principles of the disclosure. At FIG. 4, smart glasses 402, according to some embodiments, responds to a request message to import the current computer's session (not shown in FIG. 4) into smart glasses 402.

Such confirmation may require a user to focus on the time, day of week, or day/month (404, 406, and/or 408) or other point of focus in order to confirm importation of the current computer's session. When the user confirms the importation, then smart glasses 402 can create a new session at a server (preferably remote from smart glasses 402).

In some embodiments, smart glasses 402 may create this session automatically upon receipt of a communication from the computer's session initiation.

In certain embodiments, smart glasses 402 can create and maintain the session at smart glasses 402 (or alternatively at a local server) and only periodically report status updates to the remote server regarding the session.

Pursuant to the new session, a backend server (the same remote server as used to initiate the server at the computer or a different remote server) may create a mapping between a computer's session (parent) and smart glass session (child). Such a mapping may preferably present a communication between the computer's session (parent) and smart glasses session (child) such that, once mapped, the computer's session may preferably be frozen or locked at the point of a transfer to the smart glasses session.

Once the smart glasses session becomes active, then confidential or non-confidential information may be entered into the smart glasses session. During this time period—i.e., after the locking of the computer's session and before the termination of the smart glasses session (child)—the display or screen of the computer may be masked, obscured, blocked or otherwise made unreadable so no information, confidential or otherwise, that is input to the smart glasses' session is shown on the computer's display.

Figure 5:
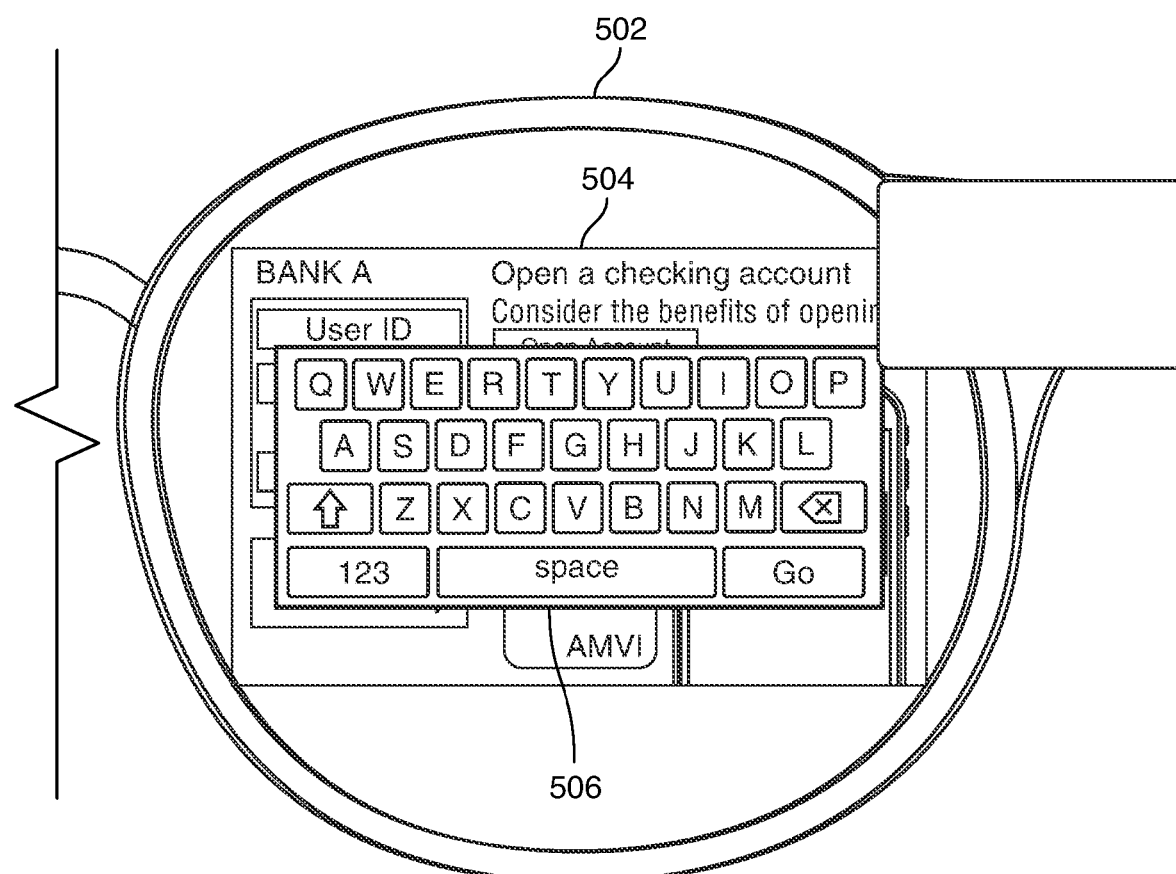
FIG. 5 shows smart glasses with a virtual keyboard set forth therein in accordance with principles of the disclosure.

FIG. 5 shows a smart glasses 502 embodiment with an interactive virtual keyboard 506 shown on a display screen 504. Display screen 504 is displayed on the smart glasses 502, in accordance with principles of the disclosure. It should be noted that other input devices may be used to enter some type of alpha-numeric identifier when prompted or when otherwise necessary to move the process forward.

In some instances, following a scan by smart glasses 502, of a QR code at the configured web page described above, the system may automatically prompt a user with a display of a keyboard (or other input display) on smart glasses 502.

Preferably, a customer can use virtual keyboard 506 to enter a username and password to log into an interactive user site, such as the interactive user site shown in display screen 504. It should be noted that a user can enter the information into virtual keyboard 506 by systems and methods known to the smart glasses industry such as, for example, by continually focusing on a particular region of the smart glasses display for a pre-determined amount of time or by some other system or method known to those of skill in the art.

In other suitable embodiments, following a scan by smart glasses 502, a previous-in-time communication between the computer and smart glasses 502 may enable display of an immediate prompt at smart glasses. Such an immediate prompt may enable the user to directly enter its confidential information following the user scan of QR code (such as QR code 306 shown in FIG. 3). In yet other embodiments, an electronic handshake between smart glasses 502 and the computer can shift the session to be active at smart glasses 502. In yet other embodiments, following a transfer from the session at the first computer to smart glasses 502, a biometric signal derived from the user by smart glasses 502 may enable the commencement of the session at the first computer. This can preferably occur absent any input at smart glasses 502 other than an automatically derived biometric signal.

Figure 6:
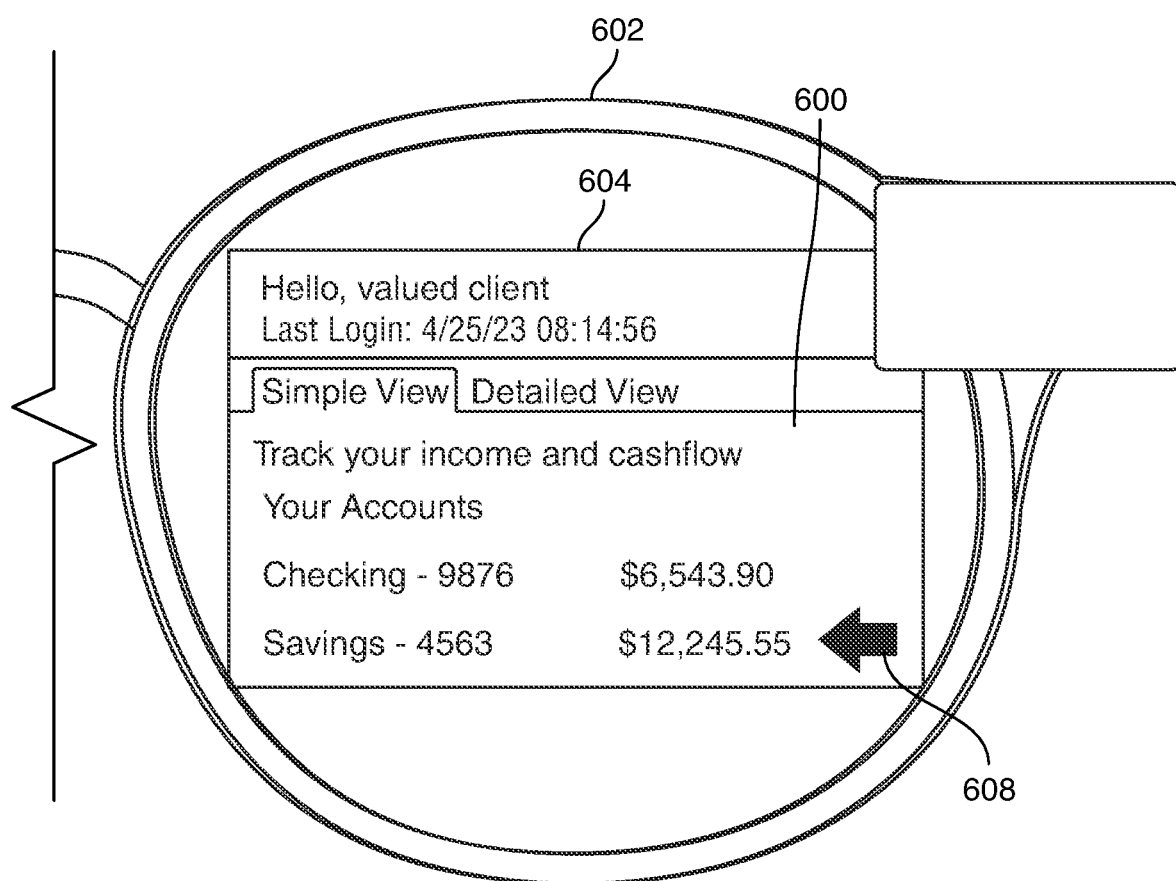
FIG. 6 shows smart glasses with a website set forth therein in accordance with principles of the disclosure.

FIG. 6 shows smart glasses 602 with a website 604 set forth therein in accordance with principles of the disclosure. Within website 604 is confidential information 600. Also shown in website 604 is reverse navigation button (in the alternative, "back button") 608.

A user can click back button 608 to release the session from smart glasses 602. By releasing the session from smart glasses 602, embodiments may preferably automatically terminate the smart glasses session and re-enable the computer's session.

In yet other embodiments, smart glasses 602 may preferably be configured to receive a communication from the computer device. The received communication can enable a user to review a confidential document on his or her smart glasses 602.

Figure 7:
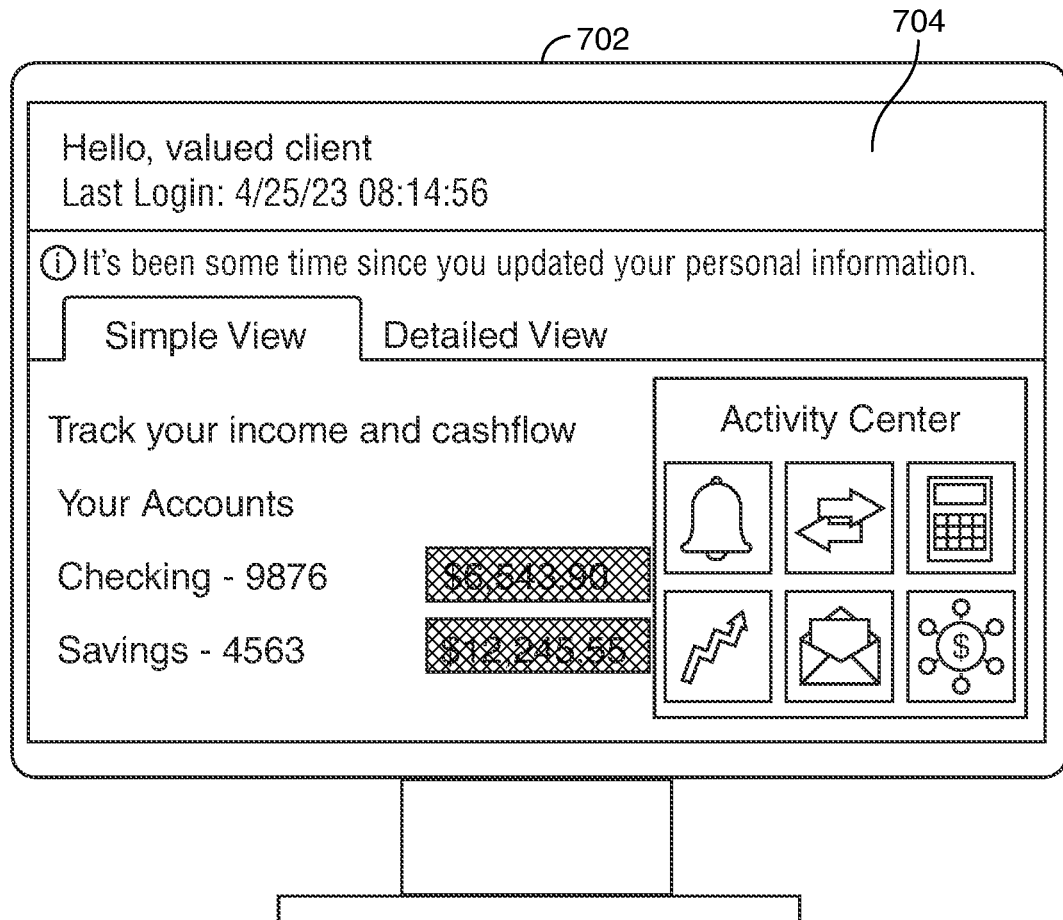
FIG. 7 shows a website configured in accordance with principles of the disclosure.

FIG. 7 shows a computer 702 configured in accordance with principles of the disclosure. Website 704 preferably shows that, after releasing the current session from smart glasses (Not shown in FIG. 7) the computer session reactivates itself and makes it ready for continuing where the smart glasses session left off. In one embodiment, the computer session can reactivate the session by reloading the session data from the server. At this point, the session has preferably been authorized by input at the smart glasses.

It should be noted that the server may be commonly updated data from both the smart glass and computer session activities. In this way, the computer session can maintain a session that had been authenticated at the smart glasses. Such a maintenance of authentication at the computer session is preferably independent of any showing of confidential information on the screen shown at the computer session. It should be noted as well that any confidential information that is needed to be shown on website 702 can preferably be masked such that the information is readable to user, but not readable to any onlookers.

Figure 8:
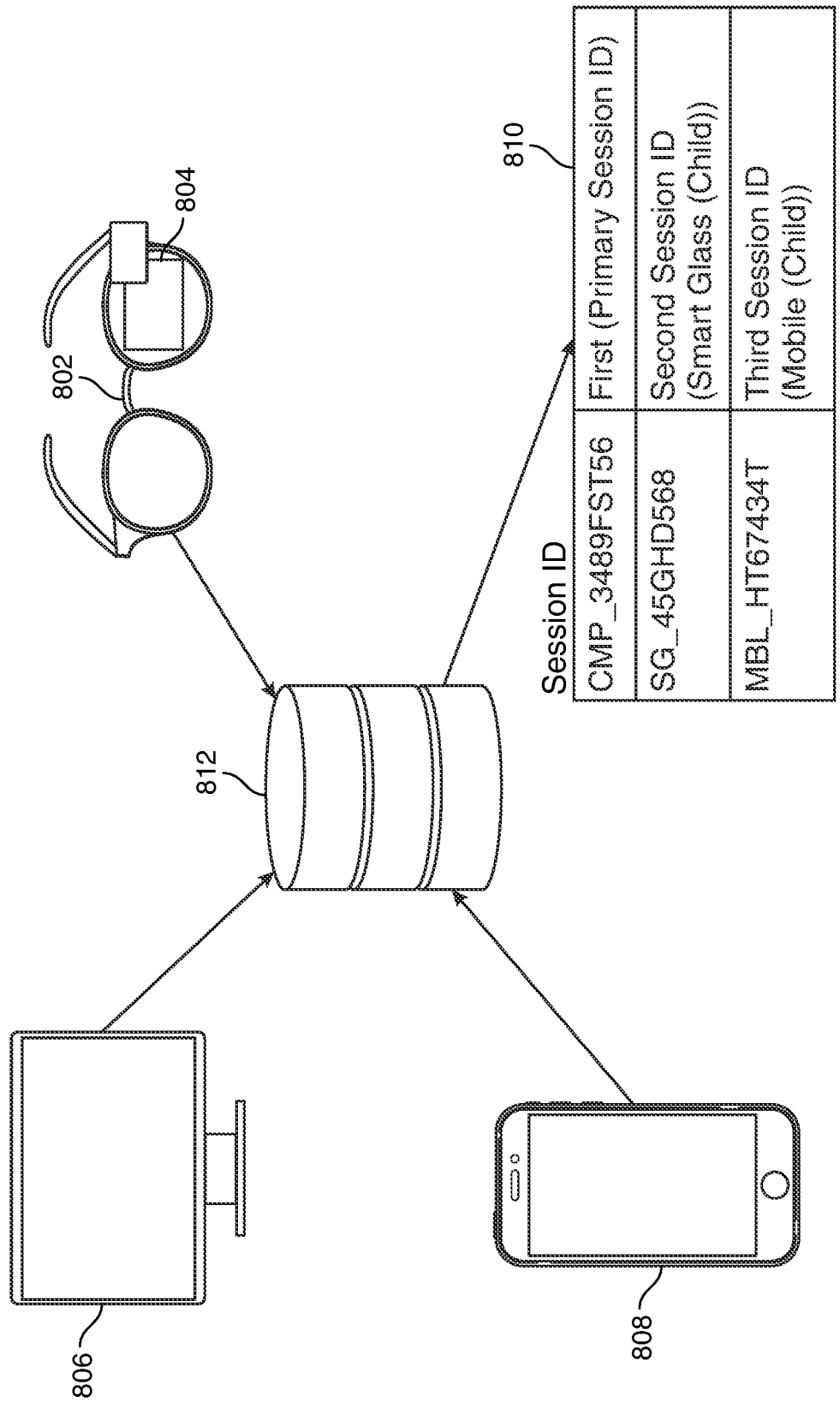
FIG. 8 shows a multi-device embodiment in accordance with principles of the disclosure.

FIG. 8 shows a multi-device embodiment in accordance with principles of the disclosure. At 812 a database is shown. Database 812 preferably hosts common session data across all the sessions shared between multiple devices.

A first smart glasses device is shown at 802. At 804, a website display 804 is shown as appearing on the smart glasses. At 806, a computer is shown. As described above, in some embodiments, the computer may be a desktop computer, a laptop computer, a tablet computer or any other suitable device with similar characteristics. At 808, a mobile device is shown. It should be noted that, in certain embodiments, mobile device 808 may act as a computer and in other embodiments, mobile device 808 may act as a smart glasses-like device, depending on the implementation of the systems and methods in accordance with the principles of the embodiments.

At 810, a list of the user session identifiers (ids) are shown alongside the identified sessions.

As described above—the common session data is shared across all the sessions that have been instantiated in accordance with the embodiments. As such, authorization may be maintained when toggling or otherwise shifting from session to session independent of revealing, during the transfer from session to session, confidential information.

Figure 9:
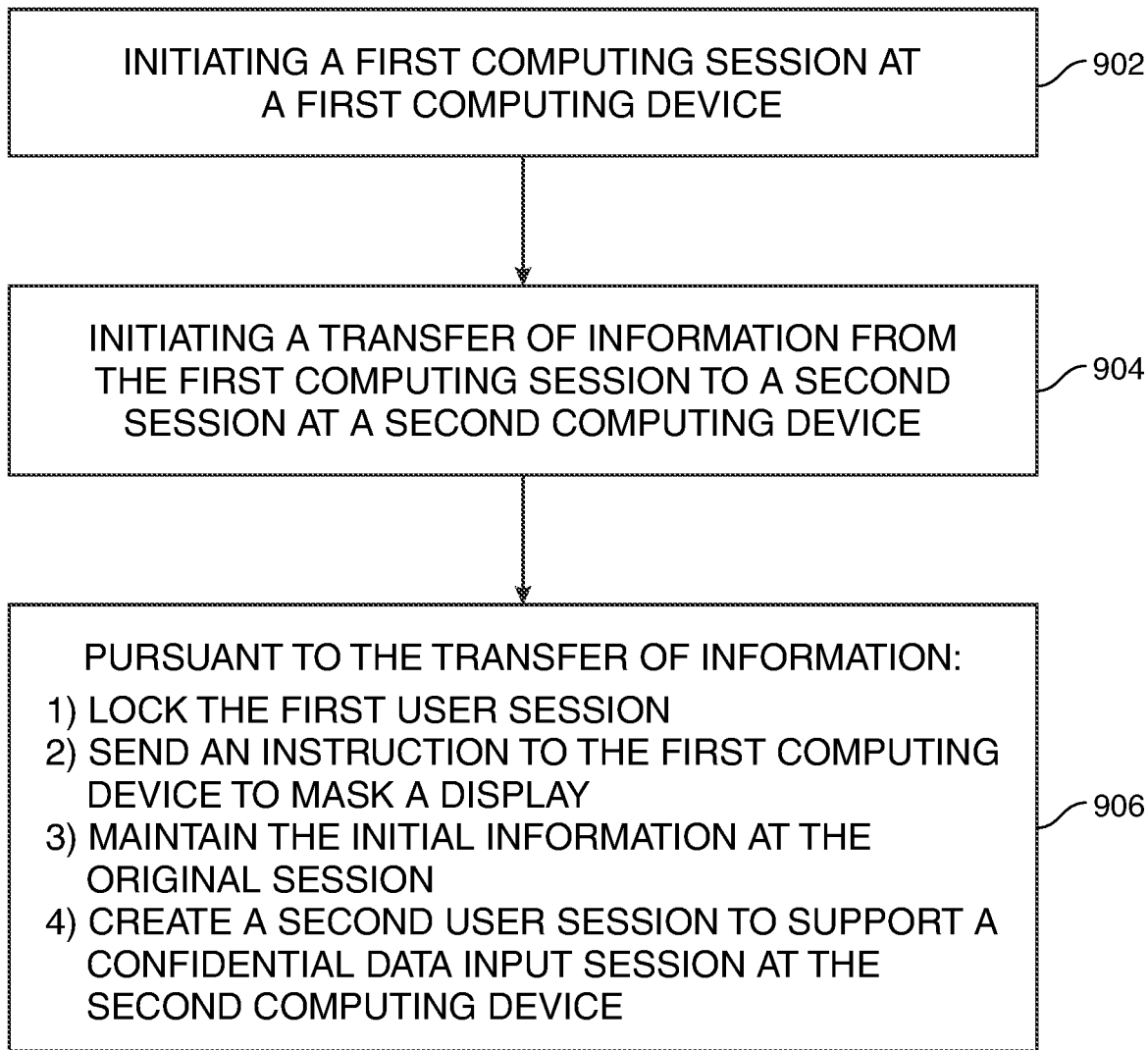
FIG. 9 shows an illustrative flow diagram in accordance with principles of the disclosure.

FIG. 9 shows an illustrative flow diagram in accordance with principles of the disclosure. Step 902 shows initiating a first computing session at a first computing device. Step 904 shows initiating a transfer of information from the first computing session to a second session at a second computing device. It should be noted that the transfer of information may occur pursuant to receiving a user command at the second computing device to create a second active session at the second computing device. Alternatively, the transfer of information may occur pursuant to receiving a user command at the first computing device to create a second active session at the second computing device. In yet other alternative embodiments, the transfer of information may occur pursuant to a detected proximity between the first computing device and the second computing device, and/or a detected point in a workflow sequence, in order to create a second active session at the second computing device.

Step 906 shows a series of steps that occur pursuant to the transfer of information. These steps may include locking the first user session, sending an instruction to the first computing device to mask a display on the first computing device, maintaining the initial information at the original session on the first computing device and creating a second user session to support a confidential data input session at the second computing device.

Thus, systems and methods for session transfer between smart glasses and computer for maintaining a confidential data view are provided. Persons skilled in the art will appreciate that the present invention can be practiced by other than the described embodiments, which are presented for purposes of illustration rather than of limitation. The present invention is limited only by the claims that follow.

What is claimed is:

1. A session-sharing system to smoothly toggle between a session hosted at a first computing device and a session hosted at a second computing device, the second device being a mobile device, the session-sharing system comprising:
   a first computing device for initiating a first computing session;
   a second computing device, said second computing device being a mobile computing device comprising a display arrangement to enable a user to input confidential information to the second computing device absent visual trespass; and
   a common data storage device having a processor and a database, said common data storage device in electronic communication, via the processor, with the first computing device and the second computing device;
   wherein the first computing device is configured to receive user session initiation information for use in initiation of a first user session, said user session initiation information being transferred for storage in the database of the common data storage device;
   wherein the second computing device further comprises a receiver, the receiver for receiving a user command to:
      lock the first user session at the first computing device;
      send an instruction to the first computing device to mask a display associated with the first user session;
      maintain the session initiation information entered at the first computing device in the database; and
      create a second user session, said second user session invoking the information from the first computing device to support a confidential data input session at the second computing device.

2. The session-sharing system of claim 1, wherein the second computing device is further configured to receive, within the second user session, confidential input data from the user, said confidential input data that authorizes the user to participate in a protected region of the first user session absent a showing of user confidential data on the first computing device.

3. The session-sharing system of claim 2, wherein, upon receipt of the confidential input data from the user, the second computing device is further configured to:
   authenticate the user to the common data storage device;
   terminate the second user session; and
   release the first user session to enable the user to interact with the first user session.

4. The session-sharing system of claim 1, wherein the first computing device comprises a computer selected from a group consisting of a desktop computer, a laptop computer and a notebook computer.

5. The session-sharing system of claim 1, wherein the second computing device comprises a smart glasses device.

6. The session-sharing system of claim 1, wherein the display arrangement further comprises a virtual keyboard for display on a display of the second computing device, said virtual keyboard configured to receive an eye focus for a pre-determined amount of time to register a keystroke.

7. A method for session-sharing between an electronic interactive session hosted at a first computing device and an electronic interactive session hosted at a second computing device, the second device being a mobile device, the method comprising:

initiating a first computing session at a first computing device, the first computing device being configured to receive first user session initiation information for use in initiation of the first computing session;

initiating a second computing session at a second computing device, the second computing device being configured to receive, using a receiver, the first user session initiation information for use in initiation of the second computing session, said second computing device being a mobile computing device comprising a display arrangement to enable a user to input confidential information to the second computing device absent visual trespass; and establishing communication between a common data storage device, said common data storage device having a processor and a database, via the processor, with the first computing device and the second computing device;

transferring said first user session initiation information for storage in the database of the common data storage device;

receiving, using the receiver at the second computing session, a user command, said user command configured to:
        lock the first user session at the first computing device;
        send an instruction to the first computing device to mask a display associated with the first user session;
        maintain the session initiation information entered at the first computing device in the database; and
        create a second user session, said second user session invoking the information from the first computing device in order to support a confidential data input session at the second computing device.

8. The method of claim 7, wherein the second computing device is further configured to receive, within the second user session, confidential input data from the user, said confidential input data that authorizes the user to participate in a protected region of the first user session absent a showing of user confidential data on the first computing device.

9. The method of claim 7, further comprising, upon receipt of the confidential input data from the user, using the second computing device to:
    authenticate the user to the common data storage device;
    terminate the second user session; and
    release the first user session to enable the user to interact with the first user session.

10. The method of claim 7, wherein the first computing device comprises a computer selected from a group consisting of a desktop computer, a laptop computer and a notebook computer.

11. The method of claim 7, wherein the second computing device comprises a smart glasses device.

12. The method of claim 7, further comprising using the display arrangement to display a virtual keyboard for display on a display of the second computing device, said virtual keyboard configured to receive an eye focus for a predetermined amount of time to register a keystroke.

13. A method for session-sharing between an electronic interactive session hosted at a first computing device and an electronic interactive session hosted at a second device, the second computing device being a mobile device, the method comprising:

initiating a first computing session at a first computing device, the first computing device being configured to receive first user session initiation information for use in initiation of the first computing session, the first computing device configured to display a Quick Response (QR) code, said QR code configured to trigger, upon being scanned by a QR code scanner in a second computing device, a second computing session at the second computing device;

in response to the trigger, initiating the second computing session at the second computing device, the second computing device being configured to receive, using the QR code scanner and a receiver, the first user session initiation information for use in triggering initiation of the second computing session, said second computing device being a mobile computing device comprising a display arrangement to enable a user to input confidential information to the second computing device absent visual trespass; and establishing electronic communication between a common data storage device, said common data storage device having a processor and a database, via the processor, the first computing device and the second computing device;

transferring said first user session initiation information for storage in the database of the common data storage device;

receiving, using the receiver at the second computing session, a user command, said user command configured to:
        lock a first user session at the first computing device;
        send an instruction to the first computing device to mask a display associated with the first user session;
        maintain the session initiation information entered at the first computing device in the database; and
        create a second user session, said second user session invoking the information from the first computing device in order to support a confidential data input session at the second computing device.

14. The method of claim 13, wherein the second computing device is further configured to receive, within the second user session, confidential input data from the user, said confidential input data that authorizes the user to participate in a protected region of the first user session absent a showing of user confidential data on the first computing device.

15. The method of claim 13, further comprising, upon receipt of the confidential input data from the user, using the second computing device to:
    authenticate the user to the common data storage device;
    terminate the second user session; and
    release the first user session to enable the user to interact with the first user session.

16. The method of claim 13, wherein the first computing device comprises a computer selected from a group consisting of a desktop computer, a laptop computer and a notebook computer.

17. The method of claim 13, wherein the second computing device comprises a smart glasses device.

18. The method of claim 13, further comprising using the display arrangement to display a virtual keyboard for display on a display of the second computing device, said virtual keyboard configured to receive an eye focus for a predetermined amount of time to register a keystroke.

19. The method of claim 13, wherein, the QR code is equipped with a public key.

20. The method of claim 19, wherein, the public key is only capable of being readably scanned and decoded by a private key stored on the second computing device.

\* \* \* \* \*